US012596951B2

(12) United States Patent
Kaushik et al.

(10) Patent No.: US 12,596,951 B2
(45) Date of Patent: Apr. 7, 2026

(54) MULTISCALE CONTIGUOUS BLOCK PIXEL ENTANGLER FOR IMAGE RECOGNITION ON HYBRID QUANTUM-CLASSICAL COMPUTING SYSTEM

(71) Applicants: IONQ, INC., College Park, MD (US); Hyundai Motor Company, Seoul (KR); Kia Corporation, Seoul (KR)

(72) Inventors: Ananth Prakash Kaushik, Santa Clara, CA (US); Sonika Johri, Cupertino, CA (US); Jason John Iaconis, Boulder, CO (US); Soon Cheol Park, Suwon-si (KR); Hanlae Jo, Seoul (KR)

(73) Assignees: IONQ, INC, College Park, MD (US); Hyundai Motor Company, Seoul (KR); Kia Corporation., Seoul (KR)

( * ) Notice: Subject to any disclaimer, the term of this patent is extended or adjusted under 35 U.S.C. 154(b) by 213 days.

(21) Appl. No.: 18/542,590

(22) Filed: Dec. 15, 2023

(65) Prior Publication Data

US 2024/0370757 A1 Nov. 7, 2024

Related U.S. Application Data

(60) Provisional application No. 63/435,511, filed on Dec. 27, 2022.

(51) Int. Cl.
G06N 10/40 (2022.01)
G06V 10/82 (2022.01)
G06V 10/94 (2022.01)

(52) U.S. Cl.
CPC ............. G06N 10/40 (2022.01); G06V 10/82 (2022.01); G06V 10/955 (2022.01)

(58) Field of Classification Search
CPC .......... G06N 10/40; G06N 3/045; G06N 3/08; G06N 3/084; G06N 10/20; G06N 10/70;
(Continued)

(56) References Cited

U.S. PATENT DOCUMENTS 7,875,876 B1 * 1/2011 Wandzura .............. G06N 10/40
257/26
9,335,606 B2 * 5/2016 Hanson .................. B82Y 20/00
(Continued)

OTHER PUBLICATIONS

"Quantum-classical convolutional neural networks in radiological image classification"; Andrea Matic, 2022 IEEE International Conference on Quantum Computing and Engineering (QCE), pp. 56-66 (Year: 2022).*

*Primary Examiner* — Michael S Osinski
(74) *Attorney, Agent, or Firm* — Patterson + Sheridan, LLP

(57) ABSTRACT

A method of performing implementing a quantum convolutional neural network (QCNN) in a hybrid quantum-classical computing system includes performing a data load operation, a set of a convolutional layer operation and a pooling operation, a measurement operation. The data load operation includes encoding pixel data of an input image onto a quantum processor using column qubits and row qubits. The convolutional layer operation includes a contiguous block pixel entangler that entangles a column qubit and a row qubit, depending on a pattern of a feature to detect in the input image. The pooling layer operation includes applying a series of one-qubit operations to the column qubits and the row qubits. The measurement operation includes measuring a state of an output qubit among the column qubits and the row qubits.

20 Claims, 12 Drawing Sheets

(58) Field of Classification Search

CPC ...... G06N 10/60; G06N 10/80; G06N 3/0464; G06N 3/09; G06N 10/00; G06N 3/04; G06N 3/048; G06N 3/088; G06V 10/82; G06V 10/955; B82Y 10/00

See application file for complete search history.

(56) References Cited

U.S. PATENT DOCUMENTS

| | | | | |
|---|---|---|---|---|
| 9,380,245 | B1 * | 6/2016 | Guidash | H04N 25/134 |
| 9,858,531 | B1 * | 1/2018 | Monroe | G06N 10/40 |
| 11,652,497 | B2 * | 5/2023 | Zheng | G06N 3/09 |
| | | | | 714/764 |
| 11,954,560 | B2 * | 4/2024 | Debnath | F28F 99/00 |
| 12,079,691 | B2 * | 9/2024 | Dou | G06N 10/20 |
| 12,086,953 | B2 * | 9/2024 | Ahn | G06F 16/54 |
| 12,340,277 | B2 * | 6/2025 | Cao | G06N 10/60 |
| 2006/0249670 | A1 * | 11/2006 | Monroe | B82Y 10/00 |
| | | | | 250/283 |
| 2007/0014481 | A1 * | 1/2007 | Kim | H04N 19/61 |
| | | | | 375/E7.154 |
| 2009/0213444 | A1 * | 8/2009 | Goto | B82Y 10/00 |
| | | | | 359/107 |
| 2017/0286858 | A1 * | 10/2017 | La Cour | G06N 10/80 |
| 2020/0118025 | A1 * | 4/2020 | Romero | G06N 3/0475 |
| 2020/0160204 | A1 * | 5/2020 | Johnson | G06N 5/01 |
| 2020/0364598 | A1 * | 11/2020 | Ashikhmin | H03M 13/611 |
| 2021/0049493 | A1 * | 2/2021 | Vivoli | G06F 17/14 |
| 2021/0150403 | A1 * | 5/2021 | Grigoryan | H03K 19/195 |
| 2021/0232963 | A1 * | 7/2021 | Gimeno-Segovia | G06N 10/70 |
| 2022/0101165 | A1 * | 3/2022 | Gwinner | G06N 10/00 |
| 2022/0141007 | A1 * | 5/2022 | Zhou | G06N 10/80 |
| | | | | 380/243 |
| 2022/0207402 | A1 * | 6/2022 | Lechner | G06N 10/40 |
| 2022/0253742 | A1 * | 8/2022 | Zheng | G06N 10/70 |
| 2023/0081852 | A1 * | 3/2023 | Kerenidis | G06N 3/08 |
| | | | | 706/32 |
| 2023/0169379 | A1 * | 6/2023 | Javadiabhari | B82Y 10/00 |
| | | | | 706/54 |
| 2023/0214701 | A1 * | 7/2023 | Jae | G06N 10/20 |
| | | | | 706/62 |
| 2023/0385677 | A1 * | 11/2023 | Rosenkranz | G06N 10/80 |
| 2024/0005195 | A1 * | 1/2024 | Griffin | G06N 10/00 |
| 2024/0095563 | A1 * | 3/2024 | Dou | G06N 10/20 |
| 2024/0303521 | A1 * | 9/2024 | Gimeno-Segovia | G06N 10/40 |
| 2025/0077929 | A1 * | 3/2025 | Rosenkranz | G06N 10/60 |
| 2025/0124328 | A1 * | 4/2025 | Gratsea | G06N 10/60 |

* cited by examiner

Column →
| $a_{0000}$ | $a_{0001}$ | $a_{0010}$ | $a_{0011}$ |
| $a_{0100}$ | $a_{0101}$ | $a_{0110}$ | $a_{0111}$ |
| $a_{1000}$ | $a_{1001}$ | $a_{1010}$ | $a_{1011}$ |
| $a_{1100}$ | $a_{1101}$ | $a_{1110}$ | $a_{1111}$ |
Row →
FIG. 4A
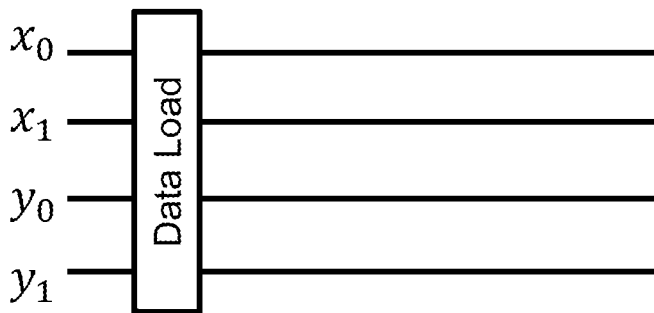
FIG. 4B
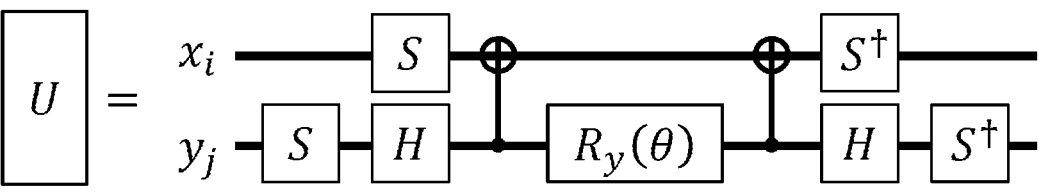
FIG. 4C Row →

Column →

$x_0$
$x_1$
$x_2$
$y_0$
$y_1$ $U$
$U$

Row →

Column →

$x_0$
$x_1$
$x_2$
$y_0$
$y_1$ $U$
$U$

MULTISCALE CONTIGUOUS BLOCK PIXEL ENTANGLER FOR IMAGE RECOGNITION ON HYBRID QUANTUM-CLASSICAL COMPUTING SYSTEM

CROSS-REFERENCE TO RELATED APPLICATIONS

This application claims priority to U.S. Provisional Application Ser. No. 63/435,511 filed Dec. 27, 2022, which is herein incorporated by reference in its entirety.

BACKGROUND

Field

The present disclosure generally relates to a method of performing computation in a hybrid quantum-classical computing system, and more specifically, to a method of solving an optimization problem in a hybrid computing system that includes a classical computer and a quantum computer that includes trapped ions.

Description of the Related Art

Convolutional neural networks (CNNs) are a type of classical machine learning model often used in computer vision and image processing applications. The structure of CNNs includes applying alternating convolutional layers and pooling layer to an input image. In the convolutional layers, a convolutional kernel is applied to different sections of the image to detect specific features of the image wherever they may appear, and convolutional kernels can be of different scales (e.g., sizes) in different convolutional layers. This methodology ensures that the CNN can capture details in different sections of the image and at different scales.

In the conventional structure of quantum convolutional neural network (QCNN), convolutional layers are generated in a quantum computer, by entangling qubits that represent different pixels of the image, without consideration of contiguity of the pixels, sizes or shapes of a convolutional kernel. Thus, quantum circuits that implement all necessary convolutional layers capture details in different sections of the images at different scales may be complex or even intractable.

Therefore, there is a need for improved methods for generating convolutional layers in a quantum computer that incorporates contiguity of pixels in an image, and sizes or shapes of a convolutional kernel to apply to the image.

SUMMARY

Embodiments of the present disclosure provide a method of implementing a quantum convolutional neural network (QCNN) in a hybrid quantum-classical computing system comprising a classical computer, a quantum processor, and a system controller. The method includes performing a data load operation including receiving, by a classical computer, an input image having a two dimensional array of pixels arranged in columns and rows, and encoding, by a system controller, pixel data of the input image onto a quantum processor using a plurality of column qubits and a plurality of row qubits, wherein the plurality of column qubits represents pixels along the column direction and the plurality of row qubits represents pixels along the row direction, performing a set of a convolutional layer operation and a pooling operation, the convolutional layer operation including applying, by the system controller, a contiguous block pixel entangler that entangles a column qubit of the plurality of column qubits and a row qubit of the plurality of row qubits, depending on a pattern of a feature to detect in the input image, and the pooling layer operation including applying, by the system controller, a series of one-qubit operations to the plurality of column qubits and the plurality of row qubits, performing a measurement operation including measuring, by the system controller, a state of an output qubit among the plurality of column qubits and the plurality of row qubits, and outputting, by the classical computer, qubit state information relating to the measured state of the output qubit, wherein the qubit state information includes information relating to whether or not the feature is contained in the input image.

Embodiments of the present disclosure also provide a hybrid quantum-classical computing system. The hybrid quantum-classical computing system includes a quantum processor including a plurality of trapped ions, each of the trapped ions having two hyperfine states defining a qubit, a system controller configured to control one or more lasers configured to emit a laser beam, which is provided to trapped ions in the quantum processor, and a classical computer. The classical computer is configured to receive an input image having a two dimensional array of pixels arranged in columns and rows, control the system controller to encode pixel data of the input image onto the quantum processor using a plurality of column qubits and a plurality of row qubits, wherein the plurality of column qubits represents pixels along the column direction and the plurality of row qubits represents pixels along the row direction, control the system controller to perform a set of a convolutional layer operation and a pooling operation, the convolutional layer operation including applying a contiguous block pixel entangler that entangles a column qubit of the plurality of column qubits and a row qubit of the plurality of row qubits, depending on a pattern of a feature to detect in the input image, and the pooling layer operation including applying a series of one-qubit operations to the plurality of column qubits and the plurality of row qubits, control the system controller to perform a measurement operation including measuring a state of an output qubit among the plurality of column qubits and the plurality of row qubits, and output qubit state information relating to the measured state of the output qubit, wherein the qubit state information includes information relating to whether or not the feature is contained in the input image.

Embodiments of the present disclosure further provide a hybrid quantum-classical computing system including nonvolatile memory having a number of instructions stored therein. The number of instructions, when executed by one or more processors, causes the hybrid quantum-classical computing system to perform operations including performing a data load operation including receiving, by a classical computer, an input image having a two dimensional array of pixels arranged in columns and rows, and encoding, by a system controller, pixel data of the input image onto a quantum processor using a plurality of column qubits and a plurality of row qubits, wherein the plurality of column qubits represents pixels along the column direction and the plurality of row qubits represents pixels along the row direction, performing a set of a convolutional layer operation and a pooling operation, the convolutional layer operation including applying, by the system controller, a contiguous block pixel entangler that entangles a column qubit of the plurality of column qubits and a row qubit of the plurality of row qubits, depending on a pattern of a feature to detect in the input image, and the pooling layer operation including applying, by the system controller, a series of one-qubit operations to the plurality of column qubits and the plurality of row qubits, performing a measurement operation including measuring, by the system controller, a state of an output qubit among the plurality of column qubits and the plurality of row qubits, and outputting, by the classical computer, qubit state information relating to the measured state of the output qubit, wherein the qubit state information includes information relating to whether or not the feature is contained in the input image.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A illustrates an example of an image having a 4×4 arrays of pixels.

FIG. 4B illustrates a quantum circuit that encodes the image shown in FIG. 4B.

FIG. 4C illustrates a quantum circuit that implements a contiguous block pixel entangler U according to one embodiment.

Figure 1:
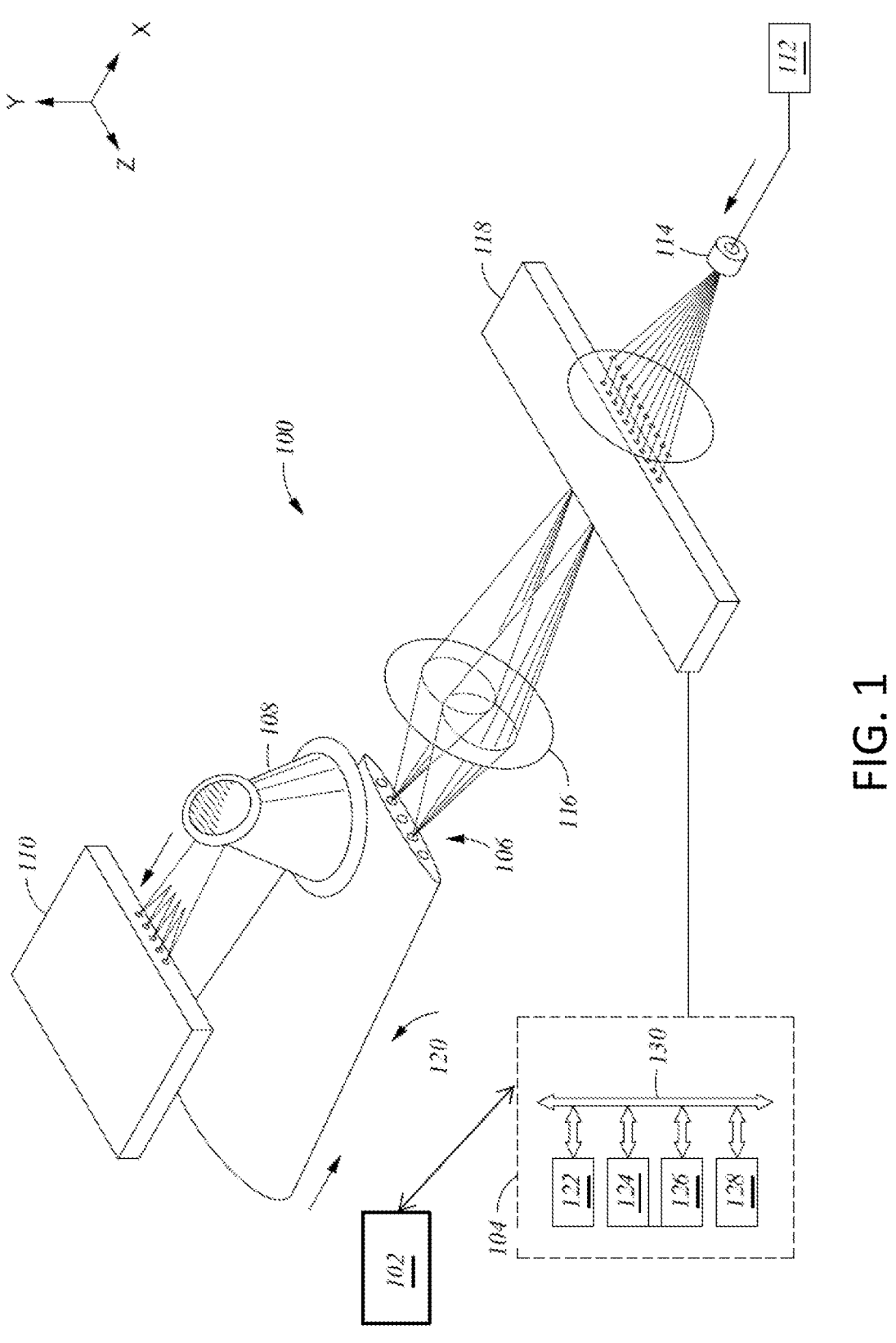
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for performing a computation using a hybrid quantum-classical computing system, and, more specifically, to implementing a quantum convolutional neural network (QCNN).

The method for implementing a QCNN uses loading of an input image onto a quantum processor maintaining spatial congruity of pixels in the image data and convolutional layer operation on the quantum processor that is used to directly detect a pattern within the input image. The loading of an input image onto a quantum processor uses two subsets of qubits, column qubits and row qubits, of the quantum processor. The convolutional layer operation uses application of a parametrized circuit on the quantum processor that entangles between a column qubit and a row qubit, but not between column qubits or between row qubits. The convolutional layer operation that translates to a different pattern (e.g., diagonal, horizontal, or vertical line) can be applied by choosing an appropriate variational parameter in the parametrized circuit. The convolutional layer operation can be applied to blocks of contiguous pixels at different scales, by choosing different sets of a column qubit and a row qubit.

General Hardware Configurations

FIG. 1 is a schematic partial view of an ion trap quantum computing system, or system 100, according to one embodiment. The system 100 includes a classical (digital) computer 102, a system controller 104 and a quantum processor that is an ion chain 106 having trapped ions (i.e., five shown) that extend along the Z-axis. The classical computer 102 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the non-volatile memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 for measurement of individual ions. Non-copropagating Raman laser beams from a laser 112, which are provided along the X-axis, perform operations on the ions. A diffractive beam splitter 114 creates an array of static Raman beams 116 that are individually switched using a multi-channel acousto-optic modulator (AOM) 118 and is configured to selectively act on individual ions. A global Raman laser beam 120 illuminates all ions at once. The system controller (also referred to as a "RF controller") 104 controls the AOM 118 and thus controls laser pulses to be applied to trapped ions in the ion chain 106. The system controller 104 includes a central processing unit (CPU) 122, a read-only memory (ROM) 124, a random access memory (RAM) 126, a storage unit 128, and the like. The CPU 122 is a processor of the system controller 104. The ROM 124 stores various programs and the RAM 126 is the working memory for various programs and data. The storage unit 128 includes a non-volatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by processor in order to perform various functionalities associated with receiving and analyzing data and controlling any and all aspects of the methods and hardware used to create the ion trap quantum computer system 100 discussed herein.

Figure 2A:
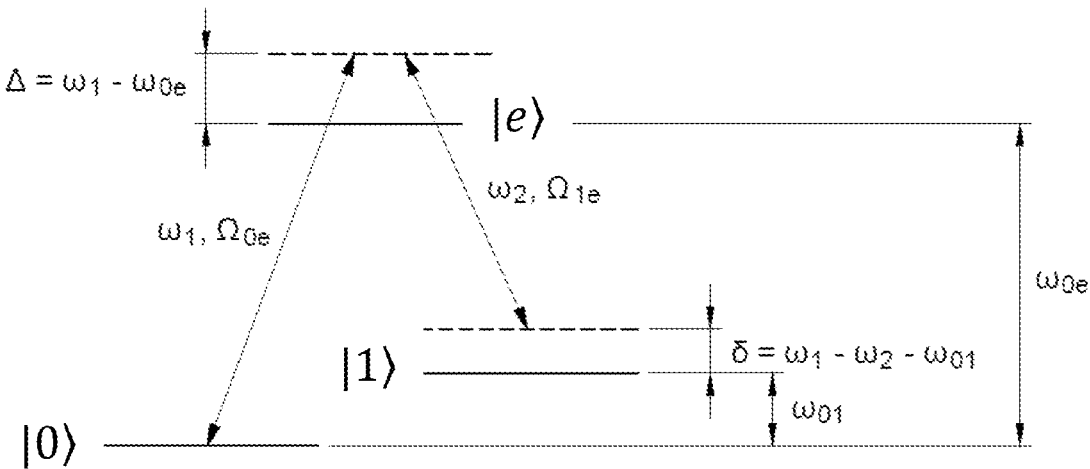
FIG. 2A depicts a schematic energy diagram of each ion in an ion chain according to one embodiment.

FIG. 2A depicts a schematic energy diagram of each ion in the ion chain 106 according to one embodiment. In one example, each ion may be a positive Ytterbium ion, $^{171}\text{Yb}^+$, which has the $^2S_{1/2}$ hyperfine states (i.e., two electronic states) with an energy split corresponding to a frequency difference (referred to as a "carrier frequency") of $\omega_{01}/2\pi=12.6$ GHz. A qubit with the two hyperfine states, used to represent computational basis $|0\rangle$ and $|1\rangle$ ($|i\rangle$ ($i\in Z$)), where the hyperfine ground state (i.e., the lower energy state of the $^2S_{1/2}$ hyperfine states) is chosen to represent $|0\rangle$. Hereinafter, the terms "hyperfine states", "internal hyperfine states," and "qubit states" may be interchangeably used to represent computational basis states $|0\rangle$ and $|1\rangle$ ($|i\rangle$ ($i\in Z$)). Each ion may be cooled (i.e., kinetic energy of the ion may be reduced) to near the motional ground state $|0\rangle_m$ for any motional mode m with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_m$ with the subscript m denotes the motional ground state for a motional mode m of the ion chain 106.

An individual qubit state of each trapped ion may be manipulated by, for example, a mode-locked laser at 355 nanometers (nm) via the excited $^2P_{1/2}$ level (denoted as $|e\rangle$). As shown in FIG. 2A, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$, between $|0\rangle$ and $|e\rangle$, as illustrated in FIG. 2A. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\omega_{0e}(t)$ and $\omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\omega_{0e}\omega_{1e}/2\Delta$, where $\omega_{0e}$ and $\omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($\text{Be}^+$, $\text{Ca}^+$, $\text{Sr}^+$, $\text{Mg+}$, and $\text{Ba}^+$) or transition metal ions ($\text{Zn}^+$, $\text{Hg}^+$, $\text{Cd}^+$).

Figure 2B:
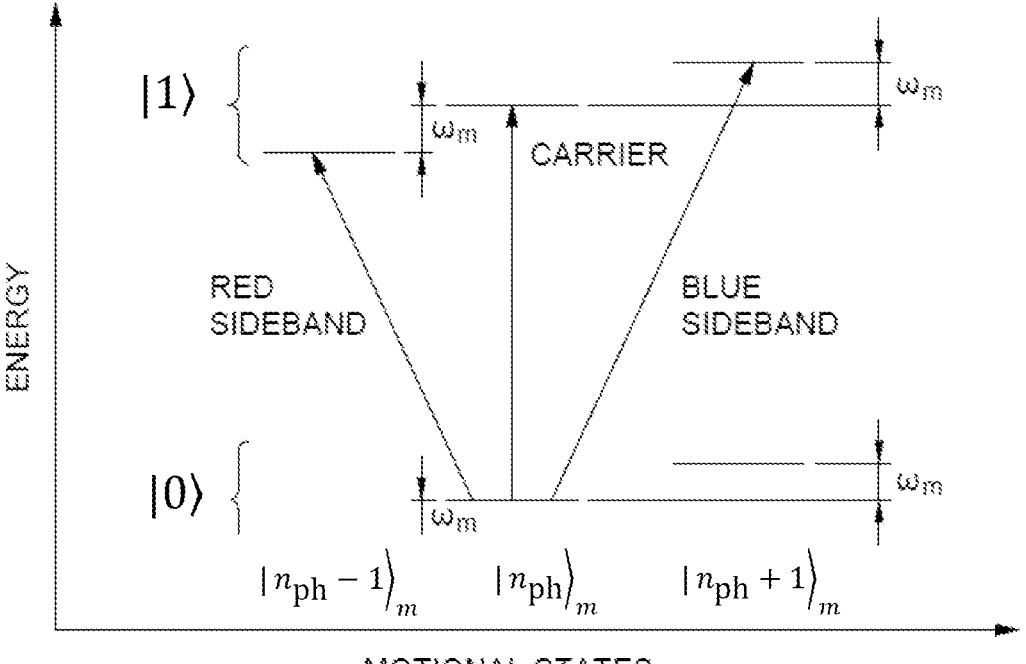
FIG. 2B depicts a schematic motional sideband spectrum of an ion in an ion chain according to one embodiment.

FIG. 2B depicts a schematic motional sideband spectrum of each ion in the ion chain 106 in a motional mode $|n_{ph}\rangle_m$ having frequency $\omega_m$ according to one embodiment. As illustrated in FIG. 2B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle$ $|n_{ph}\rangle_m$ and $|1\rangle$ $|n_{ph}+1\rangle_m$ occurs (i.e., a transition from the m-th motional mode with n-phonon excitations denoted by $|n_{ph}\rangle_m$ to the m-th motional mode with $(n_{ph}+1)$-phonon excitations denoted by $|n_{ph}+1\rangle_m$ occurs when the qubit state $|0\rangle$ flips to $|1\rangle$ ). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu<0$, referred to as a red sideband), Rabi flopping between combined qubit-motional states $|0\rangle$ $|n_{ph}\rangle_m$ and $|1\rangle$ $|n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$ ). A $\pi/2$-pulse on the blue sideband applied to a qubit transforms the combined qubit-motional state $|0\rangle$ $|n_{ph}\rangle_m$ into a superposition of $|0\rangle$ $|n_{ph}\rangle_m$ and $|1\rangle$ $|n_{ph}+1\rangle_m$. A $\pi/2$-pulse on the red sideband applied to a qubit transforms the combined qubit-motional $|0\rangle$ $|n_{ph}\rangle_m$ into a superposition of $|0\rangle$ $|n_{ph}\rangle_m$ and $|1\rangle$ $|n_{ph}-1\rangle_m$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, qubit states of a qubit can be entangled with a desired motional mode by applying the right type of pulse, such as a $\pi/2$-pulse, which can be subsequently entangled with another qubit, leading to an entanglement between the two qubits that is needed to perform an XX-gate operation in an ion trap quantum computer.

Hybrid Quantum-Classical Computing System

While currently available quantum computers may be noisy and prone to errors, a combination of both quantum and classical computers, in which a quantum computer is a domain-specific accelerator, may be able to implement complex machine learning models, such as convolutional neural network (CNN) models. A quantum convolutional neural network (QCNN) implemented in a hybrid quantum-classical computing system requires only O(log N) qubits for an input size N.

A classical CNN is trained to determine whether an input image contains a specific feature (e.g., an automobile, a truck, an airplane, a bird, a cat, a dog). To do so, an input image passes through a series of alternating convolutional layers and pooling layers. The convolutional layer uses a convolutional kernel or simply referred to as a kernel, which can determine a pattern of the feature (e.g., a wheel of an automobile) in the input image. Different convolutional layers can be used to determine different patterns of the feature. The pooling layer reduces the dimensionality of the input image. Alternating convolutional layers and pooling layers are applied until a fully connected layer is obtained, which provides an output that determines whether the input image contains the specific feature.

In a QCNN, an input image is first encoded into a quantum processor, and alternating convolutional layers and pooling layers are applied to the quantum processor. Each convolutional layer includes parametrized circuits, which determine relationships among qubits depending on a kernel to apply to the input image. Alternating convolutional layers and pooling layers are applied to the quantum processor until one qubit (out qubit) contains information of whether the input image contains the specific feature.

Figure 3:
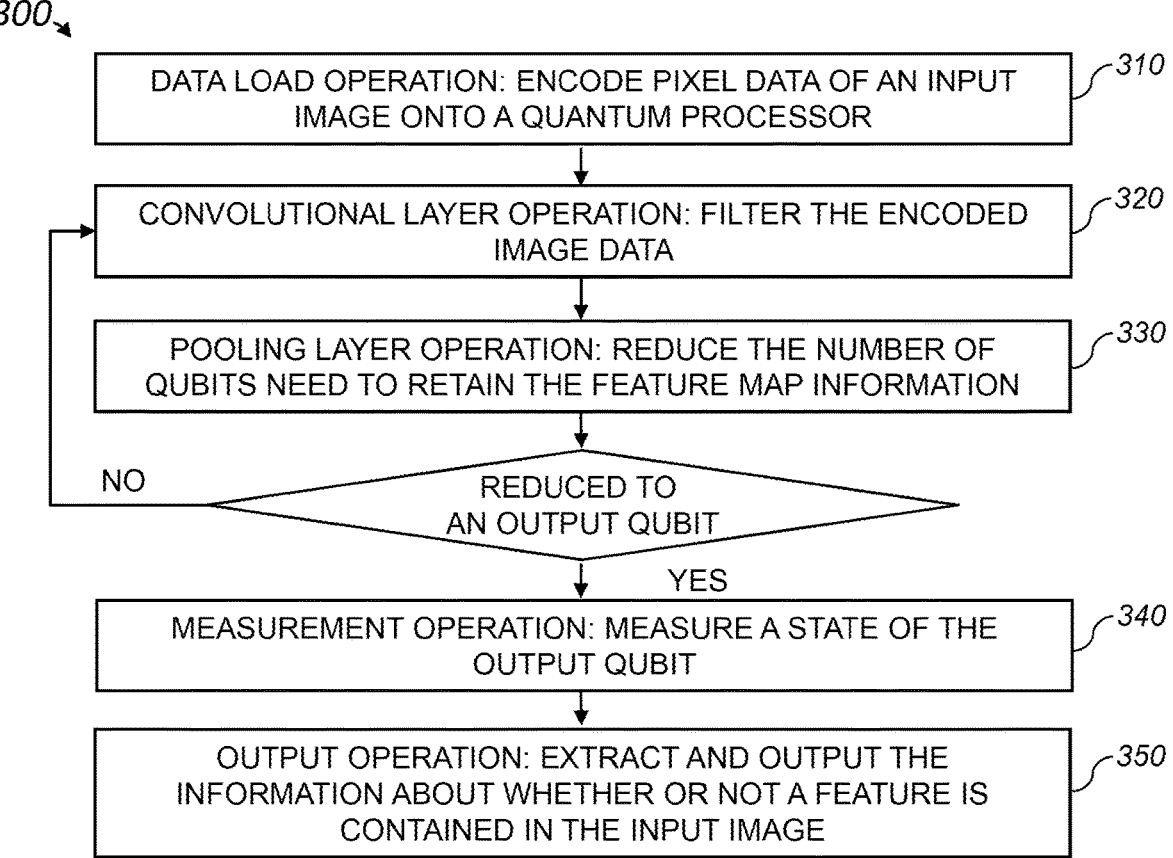
FIG. 3 depicts a flowchart illustrating a method of implementing a quantum convolutional neural network (QCNN) on a hybrid quantum-classical computing system according to one embodiment.

FIG. 3 depicts a flowchart illustrating a method 300 of implementing a QCNN on a hybrid quantum-classical computing system according to one embodiment. In this example, the quantum processor includes the ion chain 106 of trapped ions, in which the two hyperfine states of each of the trapped ions form a qubit, for example, the hyperfine ground state representing qubit state $|0\rangle$ and the hyperfine excited state representing qubit state $|1\rangle$ .

The method 300 begins with block 310, in which a data load operation is performed to encode pixel data of an input image onto the quantum processor 106. First, an input image having an $N_C \times N_R$ two dimensional (2D) array of pixels arranged in columns and rows is received by a user interface of the classical computer 102 or from the memory of the classical computer 102. Subsequently, pixel data (e.g., represented by 0 or 1) of the input image is encoded using $n_C$ column qubits (also referred to as "X qubits") ($x_0$, $x_1$, $x_2$, . . . , $x_{n_c}-1$) and $n_R$ row qubits (also referred to as "Y qubits") ($y_0$, $y_1$, $y_2$, . . . , $y_{n_{R-1}}$), by application, by the system controller 104, of a proper combination of single-qubit operations and two-qubit operations to the quantum processor 106. The quantum processor 106 is then in a superposition of states $|y_{n_{R-1}}, \ldots, y_2 y_1 y_0 x_{n_{C-1}} \ldots x_2 x_1 x_0\rangle$ having an amplitude $a_{y_{n_{R-1}} \ldots y_2 y_1 y_0 x_{n_{C-1}} \ldots x_2 x_1}$. Each state corresponds to a pixel of the input image, and its amplitude represents the intensity of the pixel data. The number of qubits $n_C \times n_R$ needed to represent $N_C \times N_R$ pixels is $\log_2(N_C \times N_R)$. Thus, pixel data of an input image can be densely encoded on the quantum processor 106, as compared to the classical computer counterpart. Further, it should be noted that since qubits of the quantum processor 106 are divided into two subsets, column qubits and row qubits, to represent pixels along the column direction and pixels along the row direction, respectively, the spatial contiguity of the pixels in an input image can be maintained in the encoded image data, and thus spatial patterns or features can be straightforwardly captured through the application of convolutional kernels in the subsequent convolutional layer operations.

For example, an image having a 4×4 arrays of pixels, as shown in FIG. 4A, is loaded onto the quantum processor 106 using 2 column qubits and 2 row qubits, as shown in FIG. 4B. In FIG. 4A, the intensities ($a_{0000}$, $a_{0001}$, $a_{0010}$, $a_{0011}$, . . . ) of the pixel data are shown in small boxes. The quantum processor 106 is in a superposition of states $a_{0000}|0000\rangle$ $a_{0001}|000\rangle+a_{0010}|0010\rangle$ $+a_{0011}|0011\rangle +$ . . . where the intensities of the pixel data $a_{0000}$, $a_{0001}$, $a_{0010}$, $a_{0011}$ . . . are encoded as amplitudes of states in the superposition.

In block 320, a convolutional layer operation is performed to filter the encoded image data. In the convolutional layer operation, a convolutional kernel (also referred to as a "kernel," a "feature detector," or a "filter") having a 2D array of weights is applied to a block of contiguous pixels of the input image, and convoluted with the image to determine a pattern in a feature (e.g., an automobile, a truck, an airplane, a bird, a cat, a dog) in the input image. The kernel is applied across the entire image, shifted by a stride (e.g., 2 pixels in the column direction and 2 pixels in the row direction). The convolutional layer operation includes application, by the system controller 104, of a contiguous block pixel entangler that is a parametrized circuit U:

$$U = \begin{bmatrix} \cos(\theta) & 0 & 0 & -\sin(\theta) \\ 0 & \cos(\theta) & \sin(\theta) & 0 \\ 0 & -\sin(\theta) & \cos(\theta) & 0 \\ \sin(\theta) & 0 & 0 & \cos(\theta) \end{bmatrix},$$

to column qubit $x_i$ (i=0, 1, . . . , $n_C-1$) and row qubit $y_j$ (j=0, 1, . . . , $n_R-1$) of the quantum processor, where $\theta$ is a variational parameter. The contiguous block pixel entangler U generates entanglements between column qubit $x_i$ (i=0, 1, . . . , $n_C$–1) and row qubit $y_j$ (j=0, 1, . . . , $n_R$–1), but not between column qubits or between row qubits, allowing entanglement structures in a block of contiguous pixels that matches the spatial contiguity of the pixels of a kernel. In some other embodiments, the contiguous block pixel entangler U is applied to a pair of column qubits $x_i$, $x_j$(i, j=0, 1, . . . , $n_C$–1), corresponding to entangling non-contiguous pixels arranged horizontally in the column direction, or a pair of row qubits $y_i$, $y_j$ (i, j=0, 1, . . . , $n_R$–1), corresponding to entangling non-contiguous pixels arranged vertically in the row direction.

The variational parameter θ can be different (e.g., $θ_1$, $θ_2$, and $θ_3$) depending on a pattern (e.g., a diagonal line in a direction between the column direction and the row direction, a horizontal line in the column direction, or a vertical line in the row direction) of the feature to detect in the input image by the kernel. The variational parameter θ for a given contiguous block pixel entangler U will be determined during training of the quantum circuit on input images with known ground truth level. There exists a cost function (such as cross-entropy) that is to be minimized during the training phase, similar to classical neural network training.

An example of the contiguous block pixel entangler U that entangles pixels arranged diagonally in a direction between the column direction and the row direction is shown in FIG. 4C. The contiguous block pixel entangler U can be implemented as a series of single-qubit operations, a phase gate $$S = \begin{pmatrix} 1 & 0 \\ 0 & i \end{pmatrix},$$

a conjugate transpose of the phase gate $$S^\dagger = \begin{pmatrix} 1 & 0 \\ 0 & -i \end{pmatrix},$$

a Hadamard gate $$H = \frac{1}{\sqrt{2}} \begin{pmatrix} 1 & 1 \\ 1 & -1 \end{pmatrix},$$

and a rotation gate $$R_y(θ) = \begin{pmatrix} \cos\left(\frac{θ}{2}\right) & -\sin\left(\frac{θ}{2}\right) \\ \sin\left(\frac{θ}{2}\right) & \cos\left(\frac{θ}{2}\right) \end{pmatrix},$$

applied individually on the column qubit $x_i$ and the row qubit $y_j$ and two-qubit operations, CNOT gate, applied on the column qubit $x_i$ and the row qubit $y_j$.

Figures 4D, 4E, 4F, 4G:
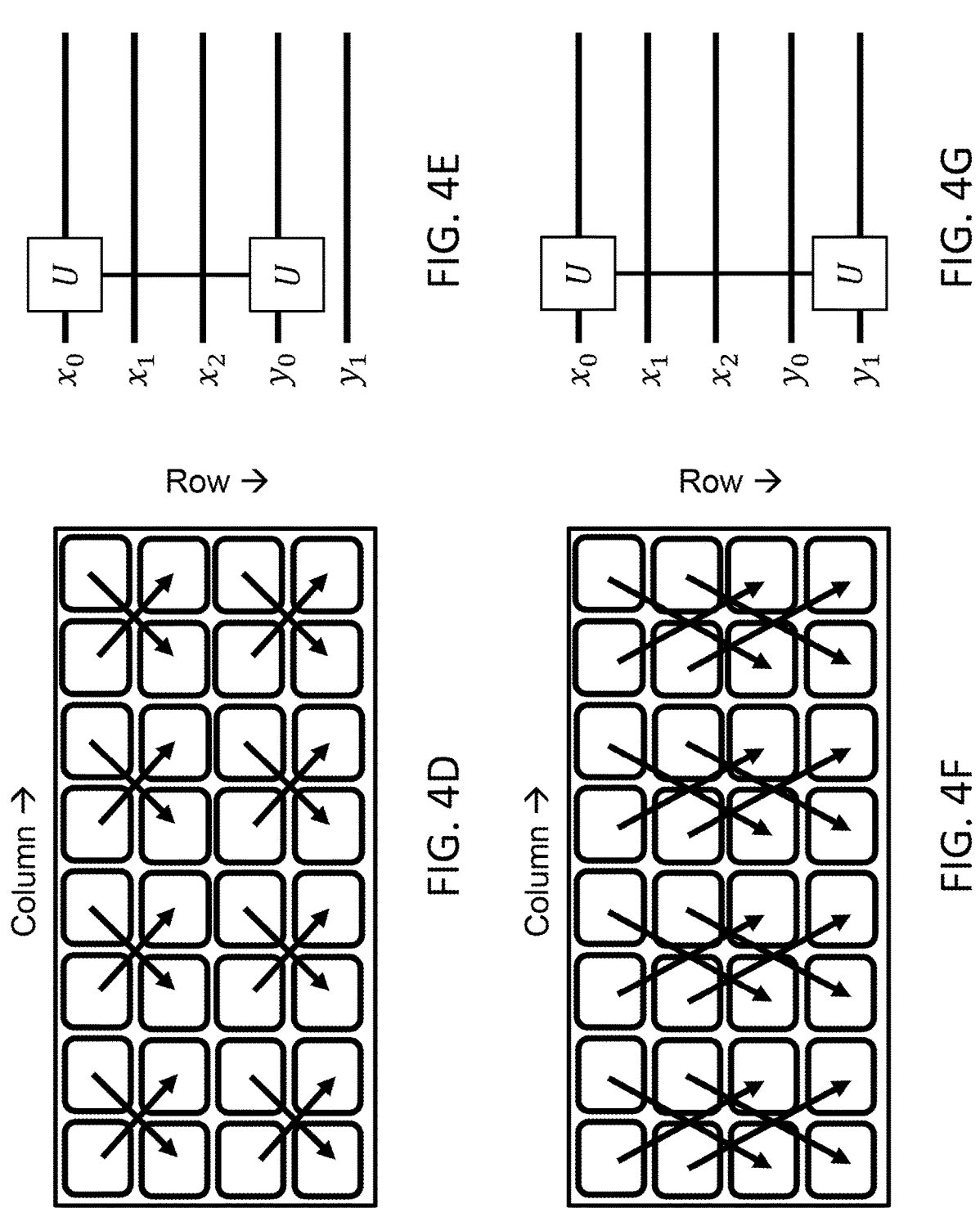
FIG. 4D illustrates a kernel of a block of 2×2 contiguous pixels applied to an 8×4 array of pixels.
FIG. 4E illustrates a quantum circuit that implements the kernel shown in FIG. 4D.
FIG. 4F illustrates a kernel of a block of 2×4 contiguous pixels applied to an 8×4 array of pixels.
FIG. 4G illustrates a quantum circuit that implements the kernel shown in FIG. 4F.

Examples of the contiguous block pixel entangler U in FIG. 4C applied to different sets of the column qubit $x_i$ and the row qubit $y_j$ are shown in FIGS. 4D, 4E, 4F, 4G, 4H, 4I, 4J, 4K, 4L, 4M, 4N, and 4O. The contiguous block pixel entangler U shown in FIGS. 4E, 4G, 4I, 4K, 4M, and 4O entangles pixels arranged diagonally in a direction between the column direction and the row direction.

Figures 4H, 4I, 4J, 4K:
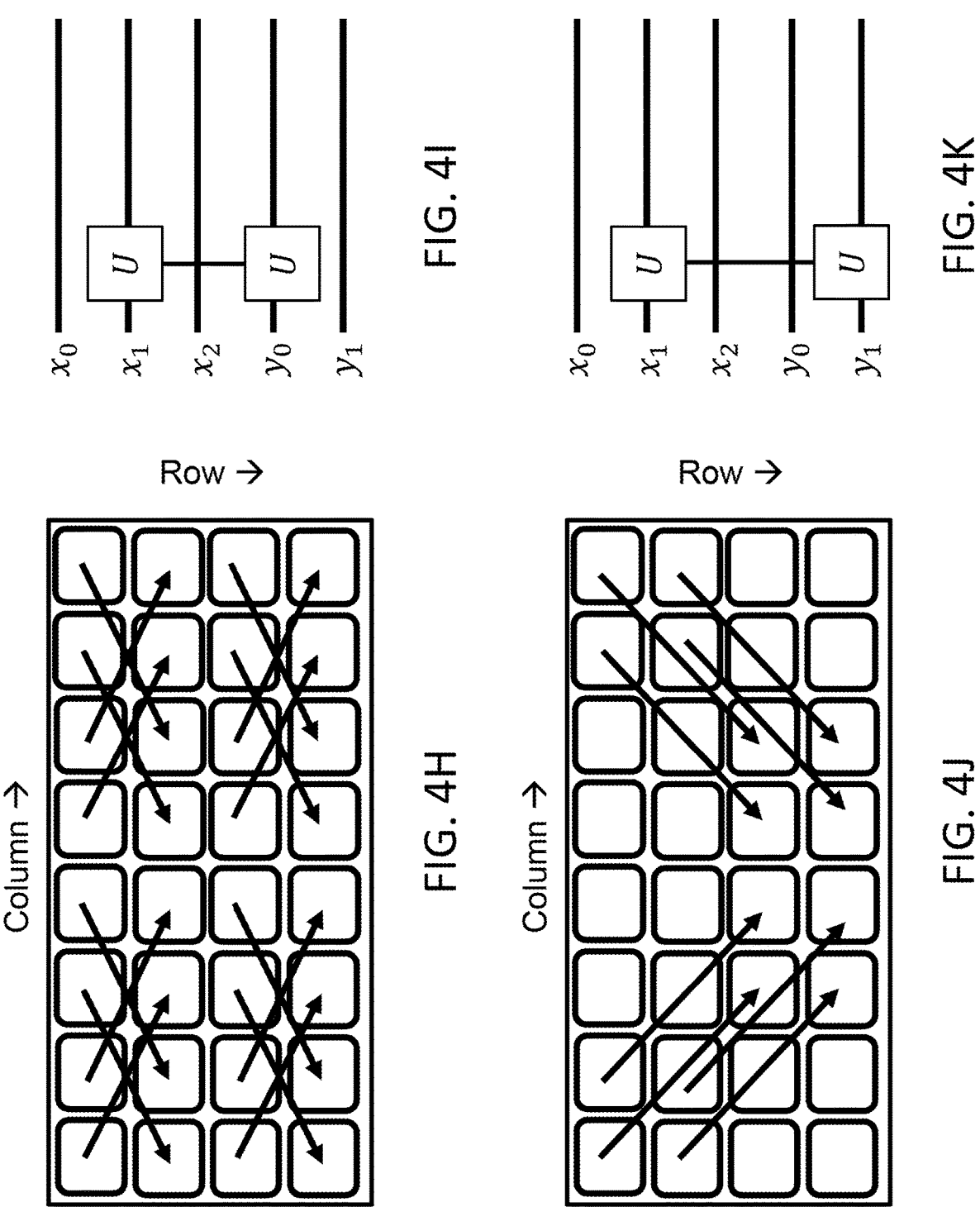
FIG. 4H illustrates a kernel of a block of 4×2 contiguous pixels applied to an 8×4 array of pixels.
FIG. 4I illustrates a quantum circuit that implements the kernel shown in FIG. 4H.
FIG. 4J illustrates a kernel of a block of 4×4 contiguous pixels applied to an 8×4 array of pixels.
FIG. 4K illustrates a quantum circuit that implements the kernel shown in FIG. 4J.
Figures 4L, 4M, 4N, 4O:
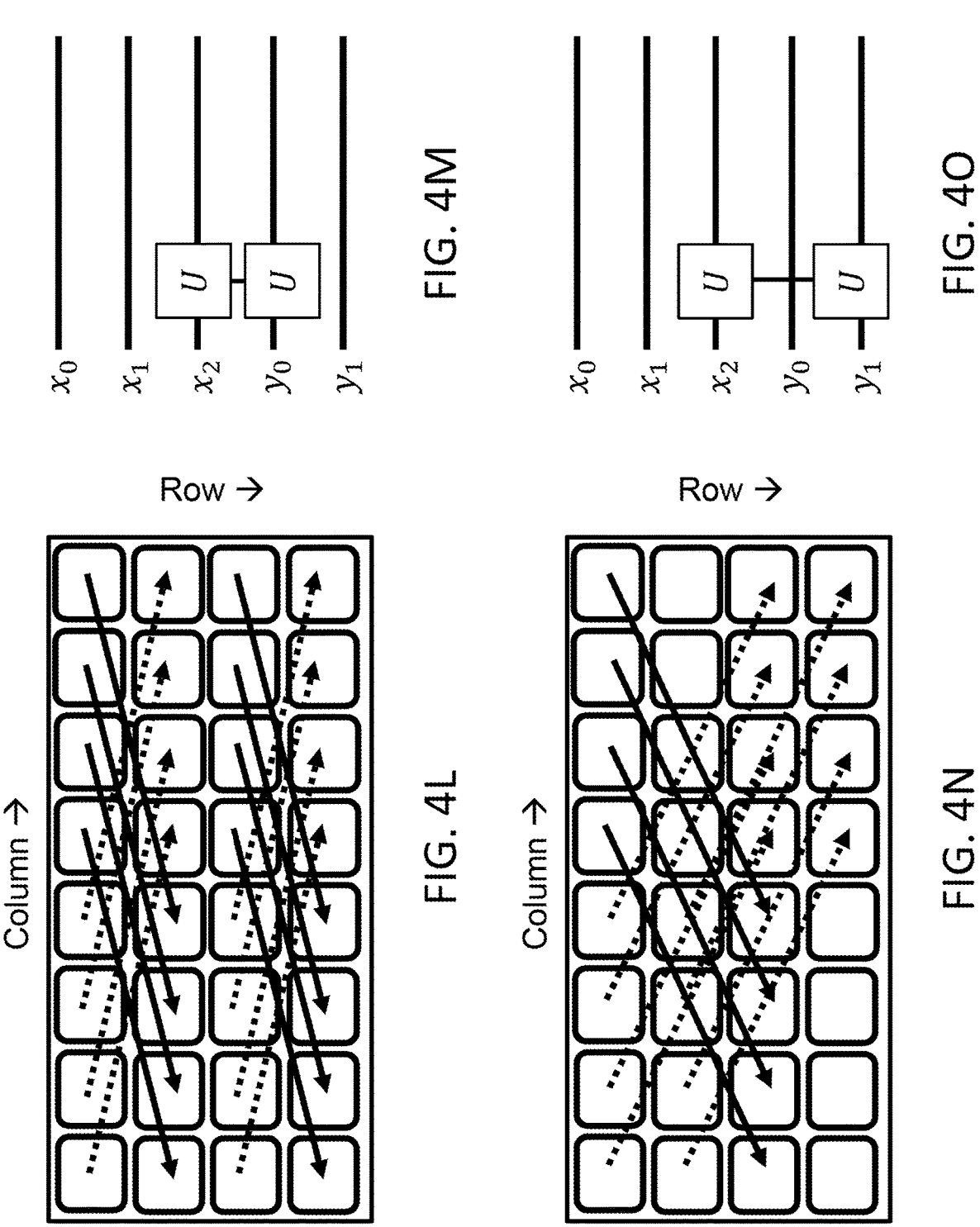
FIG. 4L illustrates a kernel of a block of 8×2 contiguous pixels applied to an 8×4 array of pixels.
FIG. 4M illustrates a quantum circuit that implements the kernel shown in FIG. 4L.
FIG. 4N illustrates a kernel of a block of 8×4 contiguous pixels applied to an 8×4 array of pixels.
FIG. 4O illustrates a quantum circuit that implements the kernel shown in FIG. 4N.
Figures 4P, 4U:
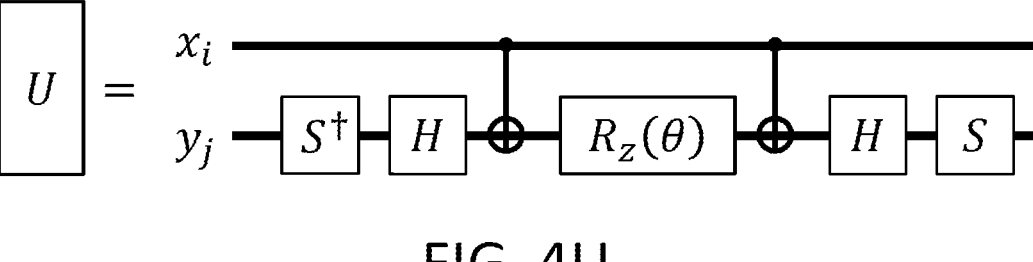
FIG. 4P illustrates a quantum circuit that implements a contiguous block pixel entangler U according to one embodiment.
FIG. 4U illustrates a quantum circuit that implements a contiguous block pixel entangler U according to one embodiment.
Figures 4Q, 4R, 4S, 4T:
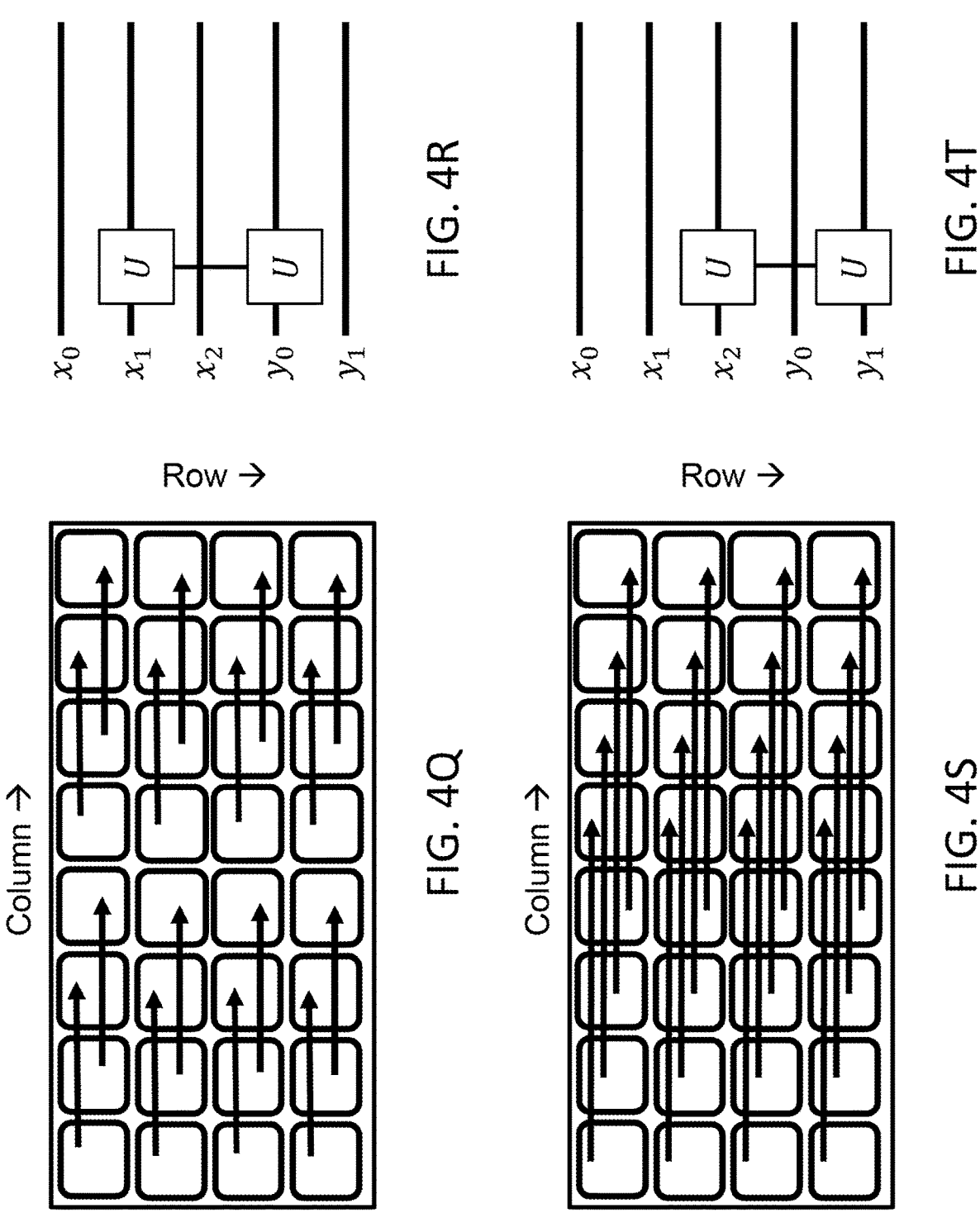
FIG. 4Q illustrates a kernel of a block of 4×2 contiguous pixels applied to an 8×4 array of pixels.
FIG. 4R illustrates a quantum circuit that implements the kernel shown in FIG. 4Q.
FIG. 4S illustrates a kernel of a block of 8×4 contiguous pixels applied to an 8×4 array of pixels.
FIG. 4T illustrates a quantum circuit that implements the kernel shown in FIG. 4S.

An example of the contiguous block pixel entangler U that that entangles pixels arranged horizontally in the column direction is shown in FIG. 4P. The contiguous block pixel entangler U can be implemented as a series of single-qubit operations, a phase gate $$S = \begin{pmatrix} 1 & 0 \\ 0 & i \end{pmatrix},$$

a conjugate transpose of the phase gate $$S^\dagger = \begin{pmatrix} 1 & 0 \\ 0 & -i \end{pmatrix},$$

a Hadamard gate $$H = \frac{1}{\sqrt{2}} \begin{pmatrix} 1 & 1 \\ 1 & -1 \end{pmatrix},$$

and a rotation gate $$R_Z(θ) = \begin{pmatrix} e^{-i\frac{θ}{2}} & 0 \\ 0 & e^{i\frac{θ}{2}} \end{pmatrix},$$

applied individually on the column qubit $x_i$ and the row qubit $y_j$ and two-qubit operations, CNOT gate, applied on the column qubit $x_i$ and the row qubit $y_j$.

Figures 4V, 4W, 4X, 4Y:
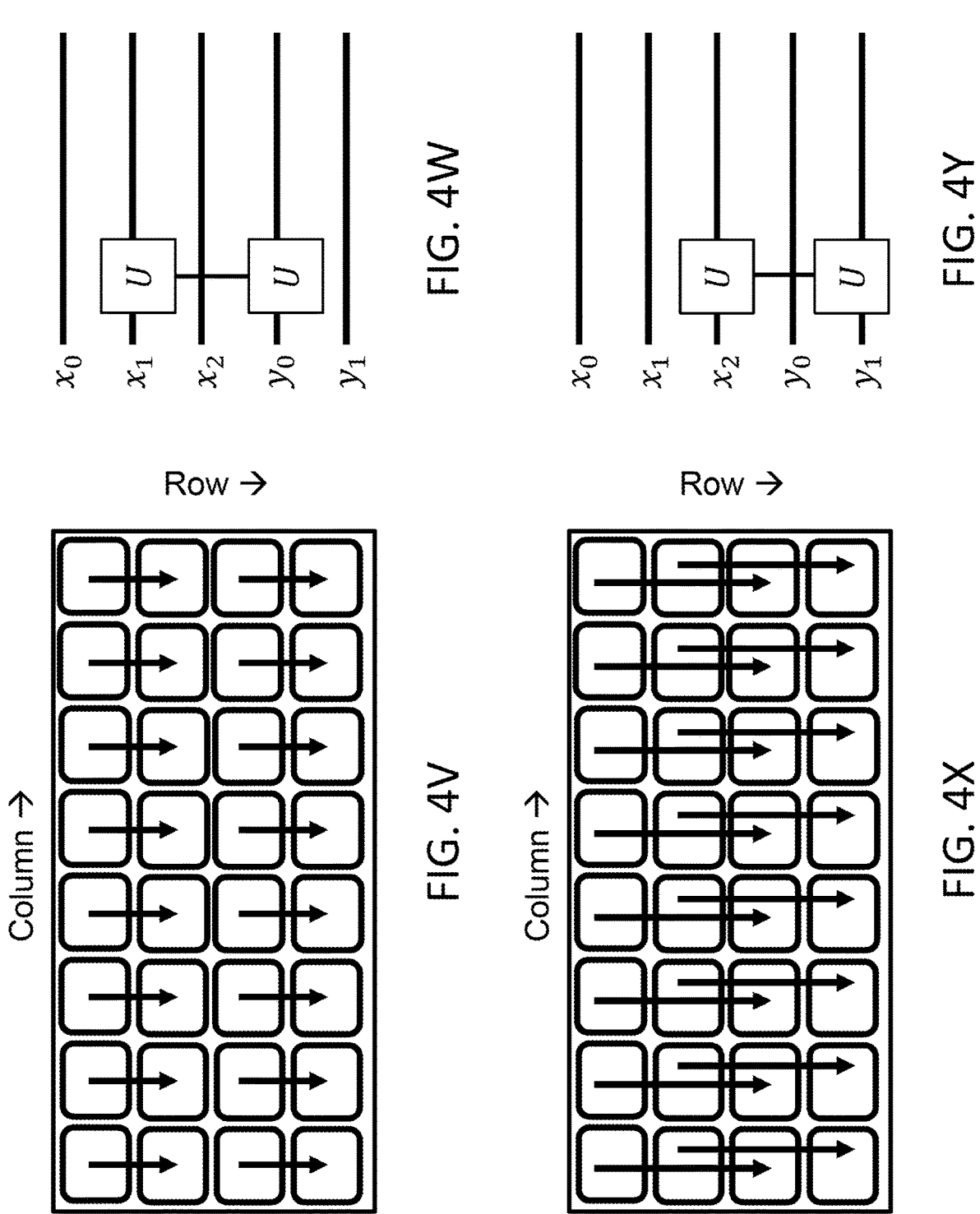
FIG. 4V illustrates a kernel of a block of 4×2 contiguous pixels applied to an 8×4 array of pixels.
FIG. 4W illustrates a quantum circuit that implements the kernel shown in FIG. 4V.
FIG. 4X illustrates a kernel of a block of 8×2 contiguous pixels applied to an 8×4 array of pixels.
FIG. 4Y illustrates a quantum circuit that implements the kernel shown in FIG. 4X.

Examples of the contiguous block pixel entangler U in FIG. 4P applied to different sets of the column qubit $x_i$ and the row qubit $y_j$ are shown in FIGS. 4Q, 4R, 4S, and 4T. The contiguous block pixel entangler U shown in FIGS. 4R and 4T entangles pixels arranged horizontally in the column direction. The contiguous block pixel entangler U shown in FIGS. 4W and 4Y entangles pixels arranged vertically in the row direction.

An example of the contiguous block pixel entangler U that that entangles pixels arranged vertically in the row direction is shown in FIG. 4U. The contiguous block pixel entangler U can be implemented as a series of single-qubit operations, a phase gate $$S = \begin{pmatrix} 1 & 0 \\ 0 & i \end{pmatrix},$$

a conjugate transpose of the phase gate $$S^\dagger = \begin{pmatrix} 1 & 0 \\ 0 & -i \end{pmatrix},$$

a Hadamard gate $$H = \frac{1}{\sqrt{2}} \begin{pmatrix} 1 & 1 \\ 1 & -1 \end{pmatrix},$$

and a rotation gate $$R_Z(\theta) = \begin{pmatrix} e^{-i\frac{\theta}{2}} & 0 \\ 0 & e^{i\frac{\theta}{2}} \end{pmatrix},$$

applied individually on the column qubit $x_i$ and the row qubit $y_j$, and two-qubit operations, CNOT gate, applied on the column qubit $x_i$ and the row qubit $y_j$.

Examples of the contiguous block pixel entangler U in FIG. 4U applied to different sets of the column qubit $x_i$ and the row qubit $y_j$ are shown in FIGS. 4V, 4W, 4X, and 4Y. The contiguous block pixel entangler U shown in FIGS. 4W and 4Y entangles pixels arranged vertically in the row direction. The contiguous block pixel entangler U shown in FIGS. 4W and 4Y entangles pixels arranged vertically in the row direction.

In FIGS. 4D-4O, 4Q-4T, and 4V-4Y and an input image having an 8×4 array of pixels (represented by the small boxes) encoded using column qubits $x_0$, $x_1$, $x_2$, and row qubits $y_0$, $y_1$ is shown as an example. Arrows between pixels represent entanglements between the pixels.

The contiguous block pixel entangler U, applied to different sets of a column qubit and a row qubit, entangles pixels in a block of contiguous pixels of different scales. For example, the contiguous block pixel entangler U applied to column qubit $x_0$ and row qubit $y_0$ entangles pixels in a block of 2×2 contiguous pixels, as shown in FIGS. 4D and 4E. The contiguous block pixel entangler U applied to column qubit $x_0$ and row qubit $y_1$ entangles pixels in a block of 2×4 contiguous pixels, as shown in FIGS. 4F and 4G. The contiguous block pixel entangler U applied to column qubit $x_1$ and row qubit $y_0$ entangles pixels in a block of 4×2 contiguous pixels, as shown in FIGS. 4H and 4I, FIGS. 4Q and 4R, and FIGS. 4V and 4W. The contiguous block pixel entangler U applied to column qubit $x_1$ and row qubit $y_1$ entangles pixels in a block of 4×4 contiguous pixels, as shown in FIGS. 4J and 4K. The contiguous block pixel entangler U applied to column qubit $x_2$ and row qubit $y_0$ entangles pixels in a block of 8×2 contiguous pixels, as shown in FIGS. 4L and 4M, and FIGS. 4X and 4Y. The contiguous block pixel entangler U applied to column qubit $x_2$ and row qubit $y_1$ entangles pixels in a block of 8×4 contiguous pixels, as shown in FIGS. 4L and 4M, and FIGS. 4S and 4T.

As illustrated in FIGS. 4D, 4F, 4H, 4J, 4L, 4N, 4Q, 4S, 4V, and 4X, the contiguous block pixel entanglers U representing different patterns of different scales can be applied in a sequence of any order to represent a pattern of arbitrary shape in the feature.

Figure 4Z:
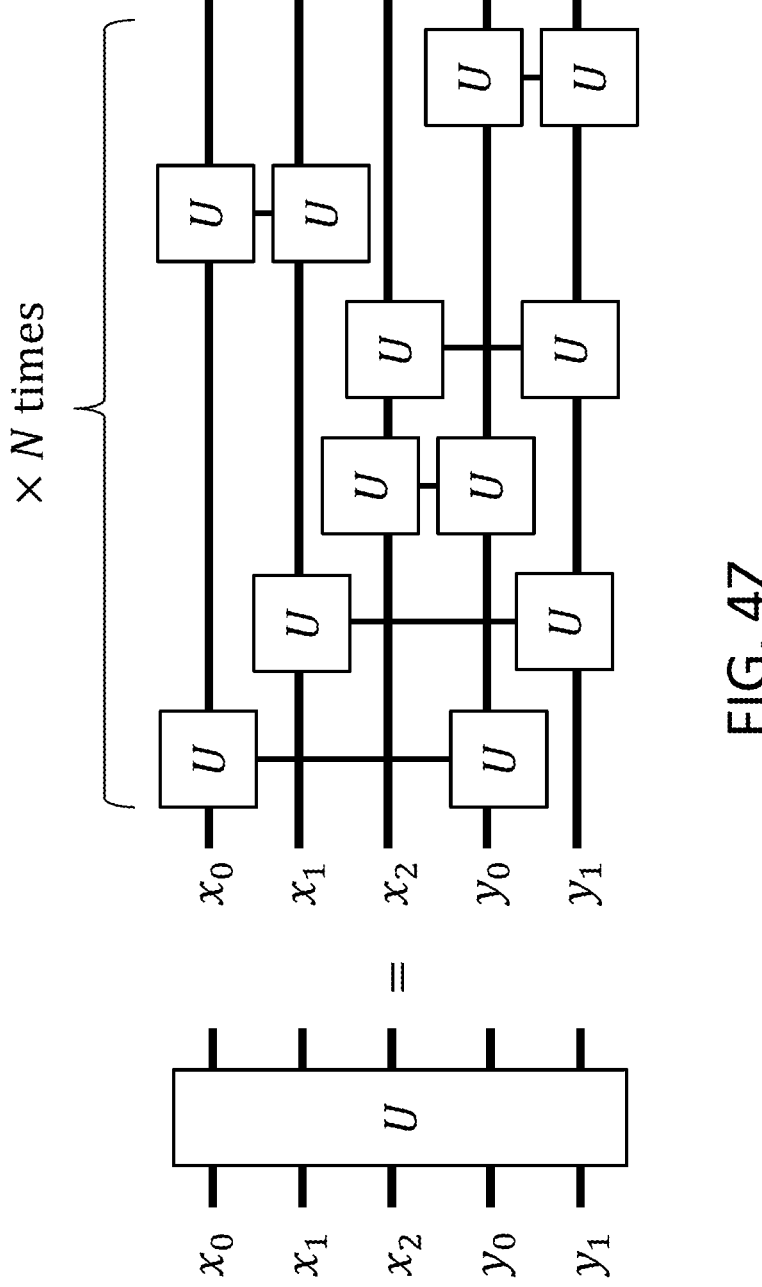
FIG. 4Z illustrates a quantum circuit that implements a convolutional layer operation according to one embodiment.

It should be noted that the convolutional layer operation can include any combinations of the contiguous block pixel entangler U shown in FIGS. 4E, 4G, 4I, 4K, 4M, 4O, 4R, 4T, 4W, 4Y, the contiguous block pixel entangler U applied to a pair of column qubits (e.g., $x_0$ and $x_1$), and the contiguous block pixel entangler U applied to a pair of row qubits (e.g., $y_0$ and $y_1$), as shown in FIG. 4Z. The sequence of the contiguous block pixel entangler U applied to different pairs of qubits can be repeated (e.g., N times).

The result of the convolutional layer operation includes information as a result of convolution of the kernel with the input image (e.g. filtered by the kernel), known as a feature map.

Figure 5:
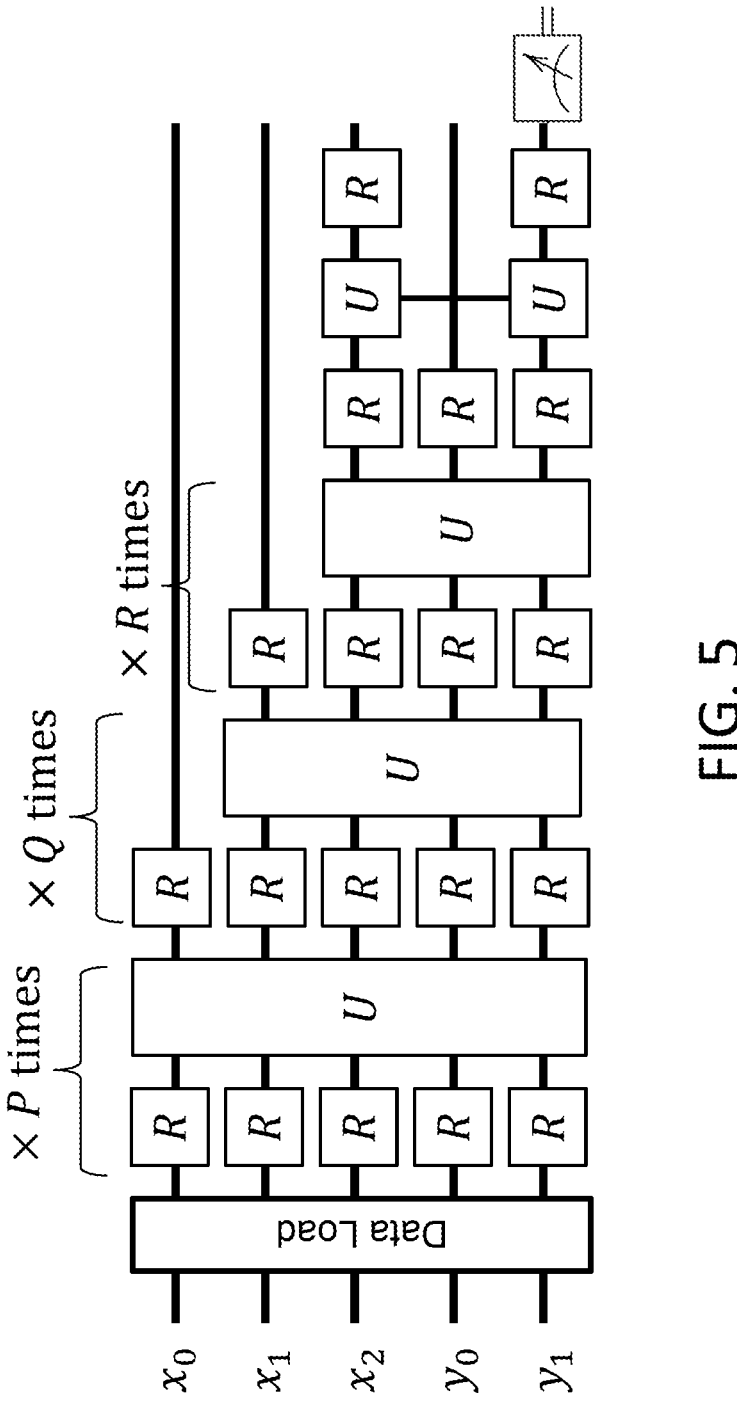
FIG. 5 illustrates a sequence of convolutional layer operations, pooling operations, and a measurement operation according to one embodiment.

In block 330, a pooling layer operation is performed to reduce the number of qubits need to retain the feature map information obtained in the convolutional layer operation in block 320. In the embodiments described herein, the pooling layer operation does not involve measurement of the qubits, but combines information carried by multiple qubits into a fewer number of qubits, by application, by the system controller 104, of a series of single-operations R to the quantum processor 106. This pooling operation is followed by another convolutional layer operation in block 320 applied to the fewer number of qubits. In the example shown in FIG. 5, a convolutional layer operation (by the application of one or more contiguous block pixel entanglers U, such as the convolutional layer operation shown in FIG. 4Z) is first applied to column qubits $x_0$, $x_1$, $x_2$ and row qubits $y_0$, $y_1$, subsequently a pooling layer to column qubits $x_0$, $x_1$, $x_2$ and row qubits $y_0$, $y_1$ to condense the feature map information onto column qubits $x_1$, $x_2$ and row qubits $y_0$, $y_1$ only, and then another convolutional layer operation (by the application of contiguous block pixel entangler U) is applied to column qubits $x_1$, $x_2$ and row qubits $y_0$, $y_1$. Each convolutional layer operation, along with the a series of single-operations R, may be repeated (e.g., P times, Q times, and R times). This set of the convolutional layer operation and the pooling layer operation is repeated until the information about the feature (e.g., whether or not the feature, such as an automobile, a truck, an airplane, a bird, a cat, a dog, is contained in the input image) is condensed into (e.g., contained only in) one qubit, referred to as a "output qubit" (e.g., row qubit $y_1$ in the example shown in FIG. 5).

In block 340, a measurement operation is performed to measure, by the system controller 104, the state of the output qubit.

In block 350, an output operation is performed to extract information about the feature (e.g., whether or not the feature, such as an automobile, a truck, an airplane, a bird, a cat, a dog, is contained in the input image) from the measured state of the output qubit and output the extracted information to a user interface of the classical computer 102 and/or save the extracted information in the memory of the classical computer 102. The extracted information, or qubit state information, is thus output during block 350. The qubit state information will include information relating to the measured state of the output qubit, wherein the qubit state information includes information relating to whether or not the feature is contained in the input image.

In the embodiments described herein, the method for implementing a quantum convolutional neural network (QCNN) uses loading of an input image onto a quantum processor maintaining spatial congruity of pixels in the image data and convolutional layer operation on the quantum processor that directly translates a pattern detection within the input image. The loading of an image uses two subsets of qubits, column qubits and row qubits. The convolutional layer operation uses application of a parametrized circuit on the quantum processor that entangles between a column qubit and a row qubit, but not between column qubits or between row qubits. The convolutional layer operation that translates to a different pattern (e.g., diagonal, horizontal, or vertical line) can be applied. The convolutional layer operation can be applied to blocks of contiguous pixels at different scales, by choosing different sets of a column qubit and a row qubit.

While the foregoing is directed to specific embodiments, other and further embodiments may be devised without departing from the basic scope thereof, and the scope thereof is determined by the claims that follow.

The invention claimed is:

1. A method of implementing a quantum convolutional neural network (QCNN) in a hybrid quantum-classical computing system comprising a classical computer, a quantum processor, and a system controller, the method comprising:

performing a data load operation comprising:

receiving, by the classical computer, an input image having a two dimensional array of pixels arranged in columns and rows; and encoding, by the system controller, pixel data of the input image onto the quantum processor using a plurality of column qubits and a plurality of row qubits, wherein the plurality of column qubits represents pixels along the column direction and the plurality of row qubits represents pixels along the row direction;

performing a set of a convolutional layer operation and a pooling layer operation, the convolutional layer operation comprising applying, by the system controller, a contiguous block pixel entangler that entangles a column qubit of the plurality of column qubits and a row qubit of the plurality of row qubits, depending on a pattern of a feature to detect in the input image; and the pooling layer operation comprising applying, by the system controller, a series of one-qubit operations to the plurality of column qubits and the plurality of row qubits;

performing a measurement operation comprising measuring, by the system controller, a state of an output qubit among the plurality of column qubits and the plurality of row qubits; and outputting, by the classical computer, qubit state information relating to the measured state of the output qubit, wherein the qubit state information includes information relating to whether or not the feature is contained in the input image.

2. The method of claim 1, wherein the contiguous block pixel entangler entangles pixels arranged diagonally in a direction between the column direction and the row direction in the input image.

3. The method of claim 1, wherein the contiguous block pixel entangler entangles pixels arranged horizontally in the column direction in the input image.

4. The method of claim 1, wherein the contiguous block pixel entangler entangles pixels arranged vertically in the row direction in the input image.

5. The method of claim 1, wherein the contiguous block pixel entangler applied to a first column qubit of the plurality of column qubits and a first row qubit of the plurality of row qubits entangles pixels in a block of 2×2 contiguous pixels in the input image.

6. The method of claim 5, wherein the contiguous block pixel entangler applied to the first column qubit of the plurality of column qubits and a second row qubit of the plurality of row qubits entangles pixels in a block of 2×4 contiguous pixels in the input image.

7. The method of claim 6, wherein the contiguous block pixel entangler applied to a second column qubit of the plurality of column qubits and the first row qubit of the plurality of row qubits entangles pixels in a block of 4×2 contiguous pixels in the input image.

8. The method of claim 1, wherein the set of the convolutional layer operation and the pooling layer operation is repeated until the information about whether or not the feature is contained in the input image is contained in the output qubit.

9. A hybrid quantum-classical computing system, comprising:

a quantum processor comprising a plurality of trapped ions, each of the trapped ions having two hyperfine states defining a qubit;

a system controller configured to control one or more lasers configured to emit a laser beam, which is provided to trapped ions in the quantum processor; and a classical computer configured to:

receive an input image having a two dimensional array of pixels arranged in columns and rows;

control the system controller to encode pixel data of the input image onto the quantum processor using a plurality of column qubits and a plurality of row qubits, wherein the plurality of column qubits represents pixels along the column direction and the plurality of row qubits represents pixels along the row direction;

control the system controller to perform a set of a convolutional layer operation and a pooling layer operation, the convolutional layer operation comprising applying a contiguous block pixel entangler that entangles a column qubit of the plurality of column qubits and a row qubit of the plurality of row qubits, depending on a pattern of a feature to detect in the input image; and the pooling layer operation comprising applying a series of one-qubit operations to the plurality of column qubits and the plurality of row qubits;

control the system controller to perform a measurement operation comprising measuring a state of an output qubit among the plurality of column qubits and the plurality of row qubits; and output qubit state information relating to the measured state of the output qubit, wherein the qubit state information includes information relating to whether or not the feature is contained in the input image.

10. The hybrid quantum-classical computing system of claim 9, wherein each of the trapped ions is $^{171}Yb^+$ having the $^2S_{1/2}$ hyperfine states.

11. The hybrid quantum-classical computing system of claim 9, wherein each of the trapped ions is one selected from $Be^+$, $Ca^+$, $Sr^+$, Mg+, $Ba^+$, $Zn^+$, $Hg^+$, $Cd^+$.

12. The hybrid quantum-classical computing system of claim 9, wherein the contiguous block pixel entangler entangles pixels arranged diagonally in a direction between the column direction and the row direction in the input image.

13. The hybrid quantum-classical computing system of claim 9, wherein the contiguous block pixel entangler entangles pixels arranged horizontally in the column direction in the input image.

14. The hybrid quantum-classical computing system of claim 9, wherein the contiguous block pixel entangler entangles pixels arranged vertically in the row direction in the input image.

15. The hybrid quantum-classical computing system of claim 9, wherein the contiguous block pixel entangler applied to a first column qubit of the plurality of column qubits and a first row qubit of the plurality of row qubits entangles pixels in a block of 2×2 contiguous pixels in the input image.

16. The hybrid quantum-classical computing system of claim 15, wherein the contiguous block pixel entangler applied to the first column qubit of the plurality of column qubits and a second row qubit of the plurality of row qubits entangles pixels in a block of 2×4 contiguous pixels in the input image.

17. The hybrid quantum-classical computing system of claim 16, wherein the contiguous block pixel entangler applied to a second column qubit of the plurality of column qubits and the first row qubit of the plurality of row qubits entangles pixels in a block of 4×2 contiguous pixels in the input image.

18. A hybrid quantum-classical computing system comprising non-volatile memory having a number of instructions stored therein which, when executed by one or more processors, causes the hybrid quantum-classical computing system to perform operations comprising:

performing a data load operation comprising:

receiving, by a classical computer, an input image having a two dimensional array of pixels arranged in columns and rows; and encoding, by a system controller, pixel data of the input image onto a quantum processor using a plurality of column qubits and a plurality of row qubits, wherein the plurality of column qubits represents pixels along the column direction and the plurality of row qubits represents pixels along the row direction;

performing a set of a convolutional layer operation and a pooling layer operation, the convolutional layer operation comprising applying, by the system controller, a contiguous block pixel entangler that entangles a column qubit of the plurality of column qubits and a row qubit of the plurality of row qubits, depending on a pattern of a feature to detect in the input image; and the pooling layer operation comprising applying, by the system controller, a series of one-qubit operations to the plurality of column qubits and the plurality of row qubits;

performing a measurement operation comprising measuring, by the system controller, a state of an output qubit among the plurality of column qubits and the plurality of row qubits; and outputting, by the classical computer, qubit state information relating to the measured state of the output qubit, wherein the qubit state information includes information relating to whether or not the feature is contained in the input image.

19. The hybrid quantum-classical computing system of claim 18, wherein the contiguous block pixel entangler entangles pixels arranged diagonally in a direction between the column direction and the row direction in the input image, pixels arranged horizontally in the column direction in the input image, or pixels arranged vertically in the row direction in the input image.

20. The hybrid quantum-classical computing system of claim 18, wherein the contiguous block pixel entangler applied to a first column qubit of the plurality of column qubits and a first row qubit of the plurality of row qubits entangles pixels in a block of 2×2 contiguous pixels in the input image, the contiguous block pixel entangler applied to the first column qubit of the plurality of column qubits and a second row qubit of the plurality of row qubits entangles pixels in a block of 2×4 contiguous pixels in the input image, and the contiguous block pixel entangler applied to a second column qubit of the plurality of column qubits and the first row qubit of the plurality of row qubits entangles pixels in a block of 4×2 contiguous pixels in the input image.

\* \* \* \* \*